United States Patent [19]

Musch et al.

[11] Patent Number: 4,786,698

[45] Date of Patent: Nov. 22, 1988

[54] POLYMERIZATION OF CHLOROPRENE

[75] Inventors: Rüdiger Musch, Bergisch Gladbach; Eberhard Müller, Dormagen; Peter Wendling, Leverkusen; Wolfgang Konter, Neuss; Gerhard Hohmann, Leverkusen, all of Fed. Rep. of Germany

[73] Assignee: Bayer Aktiengesellschaft, Leverkusen, Fed. Rep. of Germany

[21] Appl. No.: 132,975

[22] Filed: Dec. 15, 1987

Related U.S. Application Data

[63] Continuation of Ser. No. 12,243, Feb. 9, 1987, abandoned.

[30] Foreign Application Priority Data

Feb. 19, 1986 [DE] Fed. Rep. of Germany .... 3605334.1

[51] Int. Cl.$^4$ ............................................... C08F 2/24
[52] U.S. Cl. .................................... 526/220; 526/225; 526/234; 526/295
[58] Field of Search ...................... 526/220, 225, 234

[56] References Cited

U.S. PATENT DOCUMENTS 4,234,704 11/1980 Sakanaka ............................. 526/295
4,521,576 6/1985 Musch ................................. 526/295
4,525,561 6/1985 Casper ................................. 526/229

Primary Examiner—Christopher Henderson
Attorney, Agent, or Firm—Connolly & Hutz

[57] ABSTRACT

Gel-free polychloroprene is obtained, at high monomer conversions, using a polymerization initiator comprising sodium dithionite or a mixture of sodium dithionite with formamidinesulphinic acid or with potassium peroxydisulphate or with formamidinesulphinic acid and potassium peroxodisulphate or with potassium peroxodisulphate and sodium anthraquinon-$\beta$-sulphonate or with formamidinesulphinic acid and potassium peroxodisulphate and sodium anthraquinone-$\beta$-sulphonate, and in the presence of oxygen and a chain transfer agent when 30 to 90% of the initiator is present at the commencement of polymerization and the remainder is added in portions during the polymerization, only further sodium dithionite being added at a conversion >60% in the case of an initiator combination, and when 20 to 80% by weight of the total amount of chain transfer agents is present before or at the commencement of polymerization and the remaining amount is added in one or more parts at monomer conversions of greater than 20%.

8 Claims, No Drawings

POLYMERIZATION OF CHLOROPRENE

This application is a continuation of application Ser. No. 012,243 filed Feb. 9, 1987, now abandoned.

The invention relates to a process for the preparation of chloroprene polymers using a polymerization initiator containing or comprising sodium dithionite, a part of the initiator being added at the commencement of polymerization and the remaining part being metered in during the polymerization in one or more portions, and in the presence of a chain transfer agent, a part being present at the beginning of the reaction and the remaining amount being added in one or more portions.

It is usual to protect 2-chlorobutadiene (=chloroprene) against uncontrolled and premature polymerization by addition of stabilizers, such as phenothiazine, and to leave these stabilizers in the monomer during the polymerization, since it thereby becomes unnecessary to store the unstabilized chloroprene in a freezer and to protect it strictly against contact with air.

The expert knows that the free radical-initiated emulsion polymerization of chloroprene either cannot be initiated in the presence of stabilizers and/or traces of oxygen or can only be initiated with great delay.

In addition, even relatively low, technically unavoidable variations of the stabilizer content in the monomer result in relatively large variations of the start-up and an uneven course of the polymerization and thus deterioration of the product quality.

In EP-OS (European Published Specification) No. 34,747, a process is described for this case for the polymerization of chloroprene with initiator systems based on sodium dithionite. In this process, however, precisely in the case of a continuous mode of polymerization, a random monomer conversion ratio cannot be set in the individual vessels since the catalyst is added in a single portion at the start of the reaction.

In addition, a complete consumption of the peroxide initiator is not absolutely guaranteed by the choice of the peroxide/dithionite initiator ratio. As the expert knows, just such excess amounts of peroxide have a negative influence on the product properties of the finished polymer.

Precisely in the case of a continuous polymerization plant, such effects make themselves particularly noticeable in a negative fashion and lead to strong conversion variations in the vessel cascade.

High dosages of initiator and exceeded conversions cause, for example, a relatively great branching or crosslinking of the polymer, which itself leads to a deterioration of the product quality.

To obtain gel-free polymers in spite of this, the possibility exists of adding the chain transfer agent, such as, for example, n-dodecyl mercaptan (n-DDM) partly at the commencement of polymerization and staggered during the polymerization.

Because of this measure, in order to obtain gel-free products in the desired viscosity range, accurate dosage of the chain transfer agent within certain monomer conversion ranges is necessary. This is impossible because of the conversion variations described, particularly in the continuous operating mode.

The invention thus has the object of finding a process for the polymerization of chloroprene which enables reproducibly gel-free polychloroprene to be prepared, even at high monomer conversions.

The invention therefore relates to a process for the preparation of chloroprene polymers by aqueous emulsion polymerization of phenothiazine compound-stabilized chloroprene or of a mixture of chloroprene and up to 20% by weight of one or more comonomers which can be copolymerized with chloroprene, using a polymerization initiator comprising sodium dithionite or a mixture of sodium dithionite with formamidinesulphinic acid or with potassium peroxodisulphate or with formamidinesulphinic acid and potassium peroxodisulphate or with potassium peroxodisulphate and sodium anthraquinone-$\beta$-sulphonate or with potassium operoxodisulphate, formamidinesulphonic acid and sodium anthraquinone-$\beta$-sulphonate, in the presence of oxygen and a chain transfer agent, 20 to 80% by weight, preferably 35 to 45% by weight, of the total amount of chain transfer agent being present before or at the commencement of polymerization and the remaining amount being added in one or more parts at monomer conversions above 20%, preferably above 40%, which process is characterized in that 30 to 90% of the initiators are present at the commencement of polymerization and the remainder is added in portions during the polymerization, only further sodium dithionite being added at a conversion >60% in the case of an initiator combination.

0.01 to 0.3, preferably 0.01 to 0.15, % by weight of sodium dithionite is employed, relative to the monomers to be polymerized.

If mixtures containing sodium dithionite are employed as polymerization initiator, then the weight ratio of the conventional initiators to sodium dithionite extends from 0.05–5:1, preferably 0.1–3:1 parts by weight.

If a mixture of FAS and potassium peroxodisulphate is used as conventional initiators, then their weight ratio to one another is 1:10–10:1 parts by weight. If a mixture of potassium peroxodisulphate and sodium anthraquinone-$\beta$-sulphate is used, then these components can be employed in the weight ratio as quoted in U.S. Pat. No. 2,426,854. The weight ratio of FAS/potassium peroxodisulphate and sodium anthraquinone-$\beta$-sulphate can be varied within the range of values given in DE-OS (German Published Specification) No. 2,650,342.

Initiators of sodium dithionite and potassium peroxodisulphate are preferred, the dithionite to persulphate molar ratio being, in particular, 1–3:1, preferably 1–2:1.

The known anionic, cationic, non-ionic and amphoteric surface-active compounds can be employed as emulsifiers. The emulsifiers are employed, alone or combined, in amounts which ensure a surface-active action. The amounts vary, depending on the type of the compounds used and the pH range, between the order of magnitude 2 and 6 % by weight, relative to the amount of monomer employed. The polymerization is carried out at 0° to 70° C., 0°–55° C. being preferred.

Depending on the proposed use of the polymer, the monomers are usually converted to the extent of 63 to 85%, conversions of between 63 and 70% being suitable for solid rubbers in order to achieve advantageous applicational values.

Suitable comonomers are, for example, acrylonitrile, methacrylonitrile, acrylates, methacrylates, vinylidene chloride, styrene, vinyltoluenes, (1,3)-butadiene, 1-chloro-(1,3)-butadiene, 2,3-dichloro-(1,3)-butadiene, 2-chloro-3-methyl-(1,3)-butadiene and sulphur, sulphur and 2,3-dichloro-(1,3)-butadiene being preferred.

The preferred range for the subsequent metering of the chain transfer agent is at 42–60% monomer conversion.

The total amount of regulator is preferably 0.3 to 5 mmol per 100 g of monomer.

Preferred chain transfer agents are aliphatic mercaptans, particularly those having 8 to 18 carbon atoms. The mercaptans can be straight-chain or branched. Thus, primary, secondary and tertiary mercaptans can be used, but the most preferred mercaptan is n-dodecyl mercaptan. Other known chain transfer agents, for example aromatic disulphides or xanthogen disulphides, particularly xanthogen disulphides as described in EP-OS (European Published Specification) No. 53,319, can also be used. A preferred xanthogen disulphide is bis-(5-ethyl-1,3-dioxan-5-ylmethyl)-xanthogen disulphide.

Unreacted organic compounds can be removed after the reaction by steam distillation, for example at 50° C. and an absolute pressure of 20 torr.

The polymerization experiments described in the following examples were carried out to achieve particularly defined reaction conditions in a 6 vessel cascade operated continuously.

This continuous polymerization of chloroprene is known from U.S. Pat. Nos. 2,384,277, 2,394,291 and 2,831,842.

The monomer, including stabilizer and regulator, was pre-emulsified in the aqueous phase containing emulsifier and caustic soda, and then reached the reaction vessel into which the initiator had additionally been metered in. Analogous results for the polymerization were also obtained without pre-emulsification.

After leaving the stirred vessel cascade, the reaction was terminated by adding known terminators such as t-butyl-pyrocatechol or diethylhydroxylamine and simultaneously removing the monomer. The pH of the alkaline latex was reduced to pH 6.5 by means of dilute acetic acid and the polymer was isolated from this emulsion by freeze coagulation and dried (Chem. Engng. Progr. 43,391 (1974), German patent specification No. 1,051,506).

1st Comparison example

The aqueous phase (W) and the monomer phase (M) were fed, via a measurement and regulation apparatus, in a constant ratio into the first reactor of a polymerization cascade, comprising 6 identical reactors each having a volume of 50 liters. The average residence time per vessel was 30 minutes. The activator phase A was fed to the second reactor (1st polymerization vessel). The reaction occurred in the presence of air. The numbers given are parts by weight per time unit. The actual amounts can be calculated from the recipe, the densities of the individual phases, the reactor volume which was flooded, and the average residence time.

| (M) = Monomer phase: | |
|---|---|
| chloroprene | 100.0 |
| n-dodecyl mercaptan | 0.13 |
| phenothiazine | 0.015 |
| (W) = Aqueous phase: | |
| demineralized water | 140.0 |
| sodium salt of a disproportionated abietic acid | 6.0 |
| sodium salt of a condensation product of naphthalene sulphonic acid and formaldehyde | 0.7 |
| caustic soda | 0.63 |
| (A) = Activator phase: | |
| 1% by weight of aqueous sodium dithionite solution | 0.068 |
| Potassium peroxodisulphate | 0.072 |

The reaction started in the 1st polymerization vessel at an internal temperature of 11° C. The liberated heat of polymerization was dissipated and the polymerization temperature reduced to 10° C. by means of external cooling. The reaction mixture passes through the stirred vessel cascade corresponding to the feed into the 1st vessel. The reaction was terminated by addition of diethylhydroxylamine at a monomer conversion of 74%. The remaining monomer was removed from the polymer by steam distillation and the polymer latex, after reducing the pH to 6.5, was frozen out on a chill roll and isolated. The Mooney viscosity ML-4 of the polymer was 103 ME.

2nd Comparison example

The polymerization was carried out as in the 1st comparison example, but with a staggered n-DDM regulation in order to achieve the desired final conversion of 70%–80%. 0.09% by weight of n-DDM was thus fed into the 1st polymerization vessel and 0.12% by weight to the 2nd polymerization vessel. The polymerization was terminated at a monomer conversion of 72%, and worked up. A polymer having a viscosity of 118 ME was obtained.

EXAMPLE 1

The procedure as in the 2nd comparison example was carried out, but the activation and regulation in the first polymerization vessel was replaced by a staggered activation and regulation in all 5 polymerization vessels, only an Na dithionite solution being metered into the last reaction vessel for activation. The distribution of the activator solutions and the amounts of regulator per polymerization vessel are collated in Table 3. The polymer had a viscosity ML-4 of 104 ME.

EXAMPLE 2

The procedure as in Example 1 was carried out, but the n-dodecyl mercaptan regulator was replaced by an equimolar amount of xanthogen disulphide of the formula

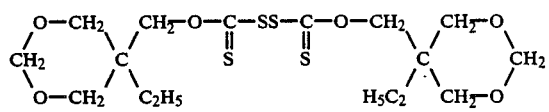

The polymer has a viscosity ML-4 of 106 ME.

As can be seen from Examples 1 and 2, a markedly more even polymerization occurs in the reaction vessels by means of the process according to the invention (cf. Table 1).

Chloroprene polymers which have been thus prepared have a markedly better property level compared to the products prepared according to the state of the art, shown, for example, by the storage stability.

TABLE 1

Dependency of the monomer conversion on the type of activation and regulation

| | 1st Comparison Example | | | | 2nd Comparison Example | | | |
|---|---|---|---|---|---|---|---|---|
| Polymerization vessel | Activator (% by weight) | | | Monomer conversion % | Activator (% by weight) | | | Monomer conversion % |
| | PS | Na D | nDDM | | PS | Na D | nDDM | |
| 1 | 0.072 | 0.068 | 0.13 | 38 | 0.072 | 0.068 | 0.09 | 36 |
| 2 | — | — | — | 56 | — | — | 0.12 | 55 |
| 3 | — | — | — | 67 | — | — | — | 64 |
| 4 | — | — | — | 71 | — | — | — | 70 |
| 5 | — | — | — | 74 | — | — | — | 72 |

| | Example 1 | | | | Example 2 | | | |
|---|---|---|---|---|---|---|---|---|
| Polymerization vessel | Activator (% by weight) | | | Monomer conversion % | Activator (% by weight) | | | Monomer conversion % |
| | PS | Na D | nDDM | | PS | Na D | MTX | |
| 1 | 0.063 | 0.044 | 0.09 | 16 | 0.063 | 0.045 | 0.27 | 14 |
| 2 | 0.0037 | 0.003 | — | 37 | 0.004 | 0.003 | — | 31 |
| 3 | 0.0034 | 0.003 | 0.10 | 56 | 0.004 | 0.003 | 0.30 | 48 |
| 4 | 0.0003 | 0.001 | 0.02 | 64 | 0.002 | 0.003 | 0.06 | 58 |
| 5 | 0 | 0.019 | — | 72 | 0 | 0.019 | — | 69 |

PS = K peroxodisulphate
Na D = Sodium dithionite
nDDM = n-dodecyl mercaptan
MTX = chain transfer agent, Formula in Example 2

EXAMPLE 3

Rheological behaviour of polychloroprene solutions

On storage of solutions of unmasticated polychloroprene, an alteration in the flow behaviour of the solutions occurs in the course of time which can lead to complete sliming of the solutions.

Since the alteration of the flow behaviour of adhesive solutions leads to a considerable impairment of the processability (worse spreadability, worse machine operation, worse spreadability, inter alia), it is necessary to masticate polychloroprene before the dissolution, even after a relatively long storage period, with considerable cost, for the preparation of high-quality adhesives with perfect processability.

For economic reasons, it is therefore desirable to also obtain viscosity-stable adhesive solutions without previous mastication.

The determination of the normal gel index (NGI) is suitable as a test method for this.

(A) Preparation of the adhesive solution 33 g of polymer is dissolved, with stirring, in 117 g of a solvent mixture comprising ethyl acetate/benzine with boiling limits 65°/95° C., and toluene in the weight ratio 2:2:1 in a 250 g wide-necked bottle with screw cap. To this, the polymer was cut into pieces of 5 mm diameter. The dissolution occurred in a sealed bottle (screw-cap with with hole) within 16 hours at 300 rpm.

After dissolution, a viscosity of 10 Pa.s was set at 23° C. with the Brookfield LVT viscosimeter by further addition of the solvent mixture used. The measurements were based on DIN 53 019, January 1979 draft.

(B) Measurement of the normal gel index (NGI) (cm)

150 g of the adhesive prepared according to (A) were placed in a 250 g wide-necked bottle with screw cap. A stirrer with graduation rings at separations of 1 cm in each case on its 7 mm thick shaft dipped into the adhesive. A truncated cone having a base diameter of 30 mm, a height of 11 mm and an angle of 45° was located at the lower end of the stirrer. This stirrer was submerged to the upper end of the truncated cone (0 mark) in the adhesive and moved with a speed of 300 rpm. Depending on the degree of viscoelasticity, the adhesive moved up the stirrer shaft during this and, after 30 seconds, reached its maximum height, which was read off in (cm) as the normal gel index (NGI) (Table 2).

TABLE 2

| Polymer from | Comparison Example | | Example | |
|---|---|---|---|---|
| | 1 | 2 | 1 | 2 |
| NGI (cm) | | | | |
| immediately | 1.5 | 4.0 | 1.0 | 0.5 |
| 14 days | 1.5 | 5.0 | 1.0 | 0.5 |
| 1 month | 2.0 | 6.0 | 1.0 | 0.5 |
| 2 months | 3.0 | 8.0 | 1.0 | 0.5 |
| 3 months | 3.5 | 10.0 | 1.5 | 0.5 |
| 6 months | 6.5 | >16[1] | 1.5 | 0.5 |

[1] no longer measurable

We claim:

1. Process for the preparation of chloroprene polymers by aqueous emulsion polymerization of phenothiazine compound-stabilized chloroprene or of a mixture of chloroprene and up to 20% by weight of at least one or more monomers which can be copolymerized with chloroprene, using a polymerization initiator comprising sodium dithionite or a mixture of sodium dithionite with formamidinesulphinic acid or with potassium peroxodisulphate or with formamidinesulphinic acid and potassium peroxodisulphate or with potassium peroxodisulphate and sodium anthraquinone-β-sulphinate or with formamidinesulphinic acid and potassium peroxodisulphate and sodium anthraquinone-β-sulphonate, in the presence of oxygen and a chain transfer agent, 20 to 80% by weight of the total amount of chain transfer agent being present before or at the commencement of polymerization and the remaining amount being added in one or more parts at monomer conversions above 20%, characterized in that 30 to 90% of the initiators are present at the commencement of polymerization and the remainder is added in portions during the polymerization, only further sodium dithionite being added at a conversion > 60% in the case of an initiator combination.

2. Process according to claim 1, characterized in that 0.01 to 0.3% by weight, relative to the monomers to be polymerized, of sodium dithionite is employed.

3. Process according to claim 1, characterized in that the polymerization is carried out at 0° to 70° C.

4. Process according to claim 3, characterized in that the total amount of regulator is 0.3 to 5 mmol per 100 g of monomer.

5. Process according to claim 1, characterized in that 2,3-dichlorobutadiene and sulphur are used as comonomers.

6. Process according to claim 1, characterized in that it is carried out continuously.

7. Process according to claim 1, characterized in that 35 to 45% by weight of the chain transfer agent is present before or at commencement of the polymerization.

8. Process according to claim 1, characterized in that the remaining amount of chain transfer agent is added in one or more parts at monomer conversions above 40%.

* * * * *